Jan. 26, 1971 HANS-JÖRG MARBY 3,558,394
METHOD OF MAKING A THREE DIMENSIONAL
CONFIGURED LAMINATED ARTICLE
Filed May 19, 1969 2 Sheets-Sheet 1

INVENTOR.
HANS-JÖRG MARBY
BY Kenwood Ross &
Chester E. Flavin
ATTORNEYS.

United States Patent Office 3,558,394
Patented Jan. 26, 1971

3,558,394
METHOD OF MAKING A THREE DIMENSIONAL CONFIGURED LAMINATED ARTICLE
Hans-Jörg Marby, 4805 Brake, Bielefeld, Germany
Filed May 19, 1969, Ser. No. 825,606
Int. Cl. B31f 1/20
U.S. Cl. 156—210    3 Claims

ABSTRACT OF THE DISCLOSURE

A mold for forming moldable materials into three-dimensional shapes (which may be geometric, non-geometric, symmetrical or asymmetrical), comprising a pair of complemental upper and lower molding forms or platens, each fabricated from a flexible material, the forms being adapted to be shaped into complemental three-dimensional configurations and each carrying three-dimensional pattern elements permanently or detachably connected thereto so as to protrude therefrom.

BACKGROUND OF THE INVENTION (1) Field of the invention

Molds for forming moldable materials into three-dimensional shapes.

(2) Description of the prior art

In the manufacture of a panel of sandwich construction, comprising an intermediate pocketed core disposed between two facing layers, the formation of the components is usually effected separately, using separate molds and presses, and the molds necessary to produce the inner cores are generally expensive.

SUMMARY OF THE INVENTION

This invention concerns molds constructed for use to effect three-dimensional shaping of a charge of moldable material rejected therebetween or, alternatively, constructed so as to be capable of being used both to shape a charge of moldable material three-dimensionally and to apply external facings thereto.

The molds can be constructed for the production of pocketed cores in a very inexpensive manner and may, if desired, be so constructed that use thereof serves to produce a complete sandwich panel.

The pattern elements of the mold forms are, in certain circumstances, advantageously made of a foamed plastic material and, in a preferred practical construction, the upper mold form carries pattern elements distributed thereover so as to be aligned with corresponding areas of the lower mold form whereon no pattern elements are provided, and vice versa.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
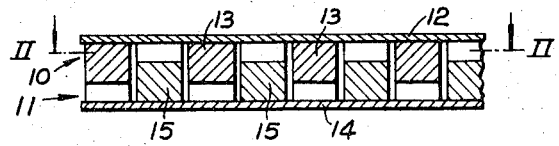
FIG. 1 is a fragmentary, diagrammatic, cross-sectional side view illustrating one embodiment of the mold of the invention, the section corresponding to the line I—I of FIG. 2.

Referring first to FIG. 1, the mold conforming to the invention here illustrated comprises an upper form 10 and a lower form 11. Upper form 10 comprises a generally planar platen 12 made of a flexible material, such as a fully-cured or polymerized, or partially-cured or partially-polymerized plastic material, according to the intended use of the mold as will subsequently become evident. From the lower surface of the platen project a plurality of three-dimensional pattern elements 13, which may again be of a fully or partially cured plastic material, but may be of metal, wood, or a foamed plastics material. These pattern elements may be permanently secured in position or may be detachably secured in any convenient manner.

Lower form 11 is substantially identical in its construction to upper form 10, except that it is inverted as compared with the latter, and comprises a generally planar platen 14 of flexible material and upwardly projecting three-dimensional pattern elements 15.

Figure 2:
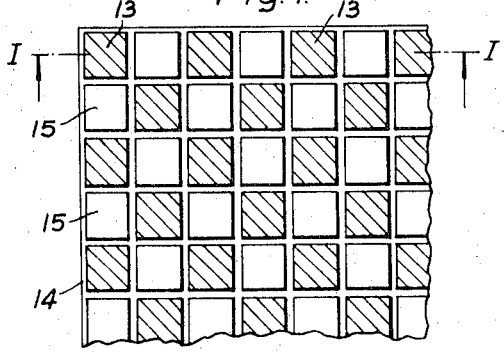
FIG. 2 is a fragmentary, diagrammatic, cross-sectional plan view, on the line II—II of FIG. 1, and illustrating the distribution of the pattern elements in the mold of FIG. 1.

FIG. 2 illustrates the distribution of pattern elements 13, 15 over their respective platens 12 and 14. As can be seen, each of such pattern elements is substantially cubic in shape. Pattern elements 15 are distributed over platen 14 in rows, the spacing between adjacent pattern elements in each row being equal to the edge dimension of the cubes plus a clearance equal to twice the desired wall thickness of an article to be shaped in the mold, and each row is staggered relative to the next adjacent row or rows, so that each pattern element in each row lies alongside and centrally of a corresponding space in the next adjacent row. Pattern elements 13 of platen 12 are distributed in a similar manner, it being appreciated, however, that the arrangement thereof is complementary to the arrangement of pattern elements 15, so that, upon bringing forms 10 and 11 together into confrontation, as shown in FIG. 1, pattern elements 15 enter into the spaces between pattern elements 13 in interdigitating manner, the horizontal spacing between adjacent ones of such elements then being equal to the desired wall thickness of an article to be produced by such mold.

The mold so described can be constructed so as to be reusable for molding a succession of articles, or so as to be usable only once in the respect that it may become integral with the article being molded thereby and therefore no longer available for reuse.

Figure 3:
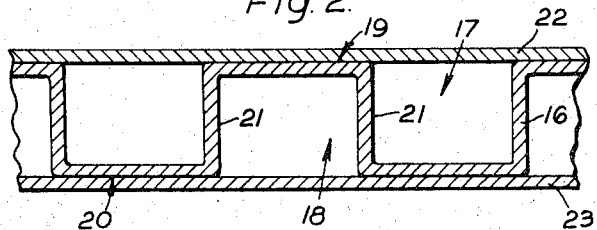
FIG. 3 is an enlarged, fragmentary, sectional side elevational view illustrating part of a sandwich panel including a core molded by use of the FIGS. 1 and 2 mold.
Figure 5:
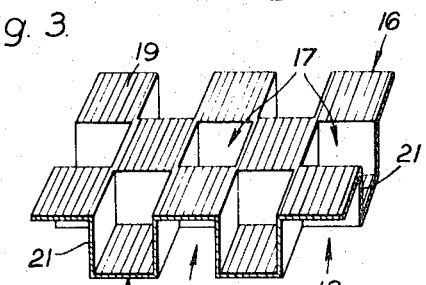
FIG. 5 is a fragmentary, perspective view showing the form of the core of the FIG. 3 sandwich panel.

Dealing first with the application wherein the mold is intended for reuse, it is constructed so as to be capable of molding, in succession, a plurality of pocketed cores 16, of the form illustrated in FIG. 5, suitable for use in the manufacture of sandwich panels of the type illustrated in FIG. 3. In this instance, platens 12 and 14 will be of any suitable flexible material, and the three-dimensional pattern elements 13 and 15 will be of a solid material rather than a foamed plastic.

In the muse of the mold, forms 10 and 11 are first separated from one another and the material to be molded is introduced therebetween. Such may be, for example, a sheet of partially-cured plastic material, or a thermoplastic sheet appropriately warmed to render it pliable and moldable, or it may be a liquid or pasty fill of synthetic or nonsynthetic material which is applied to lower form 11. In the instance where the moldable material is liquid or otherwise likely to be expressed from the mold, forms 10 and 11 are conveniently adapted for sealing interengagement around their outboard edges so as to prevent any material loss.

The moldable material having been introduced between upper and lower forms 10, 11, the forms are brought together, in the manner illustrated in FIG. 1, until the spacing between platens 12, 14 and the respective confronting faces of pattern elements 15, 13 is substantially equal to the adjacent faces of pattern elements 13 and 15.

Upon the setting of the moldable material in the mold, which may occur by polymerization or curing or cooling or setting or the like according to the nature of the specific material employed, forms 10 and 11 are then separated and a resultant core 16 is removed.

As shown in FIG. 5, core 16 has pockets 17 and 18 extending therein from opposite sides thereof, corresponding to respective pattern elements 13, 15, the pockets being connected by substantially square coplanar outer face surfaces 19, 20 and perpendicular sidewalls or connecting webs 21.

A sandwich panel, as shown in FIG. 3, can now be constructed, using core 16 and applying thereto two facing layers 22, 23 so as to abut against and be secured to outer face surfaces 19, 20 at opposite sides of the core. Facing layers 22, 23 can be, for example, of sheet plastic material, timber, plywood, hardboard or other suitable material, and may be secured as by nailing, screwing, adhering, bonding or other suitable means.

Figure 6:
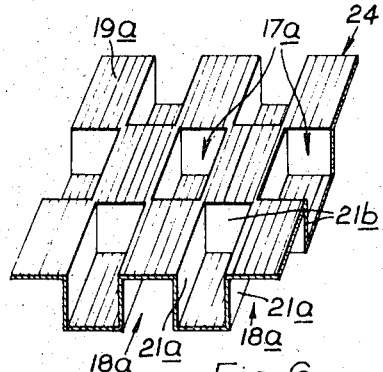
FIG. 6 is a view, similar to FIG. 5, but showing an alternative configuration for the core.

Naturally, in the arrangement so far described, it is not essential that pattern elements 13, 15 be substantially cubic, as shown in FIGS. 1 and 2. Thus, if it is desired that the molded core be of the form shown at 24 in FIG. 6 wherein its pockets 17a and 18a are substantially rectangular, and the respective outer face surfaces 19a and 20a are substantially rectangular so as to provide webs 21a which will impart greater strength in one direction across core 24 than the webs 21b in the other direction across the core, then, in such instance, correspondingly-shaped rectangular pattern-forming elements 13, 15 are employed.

Other shapes, which may be regular or irregular, geometrical or nongeometrical, symmetrical or asymmetrical, can be employed, as desired, all in order to achieve a desired strength relationship longitudinally and transversely of the core.

Too, they may be so arranged that walls 21, 21a, 21b or corresponding walls formed in the core may be disposed at any desired angle relative to outer face surfaces 19, 20 or 19a, 20a.

It will be appreciated, also, that if the pattern elements used on forms 10, 11 in the reusable mold are detachably secured to their respective platens 12, 14, selected ones of such pattern elements can be omitted and/or replaced by pattern elements of different shapes, all so that the configuration of the resultant molded article can be varied.

By use of flexible platens 12, 14, the platens will give or yield, as necessary, during the actual molding operation, in order to compensate for variations in the thickness of the material being molded and for stresses occurring during the molding and arising, for example, as a result of more rapid setting in certain parts or regions of the molded article than in other parts or regions, or as a result of different tensions occurring therein during the confronting of the two mold forms.

The mold as described can, in practice, be constructed of such dimensions as to produce cores for sandwich panels of sizes suitable for use as doors and panelling in building structures.

Figure 7:
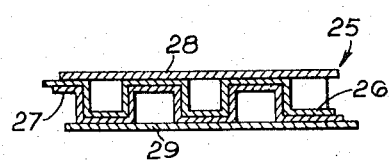
FIG. 7 is a view, similar to FIG. 3, but showing a modified form of sandwich panel construction wherein the core is in a plurality of nested sections.

It is also possible, in the manufacture of very large sandwich panels, to form the cores thereof in a plurality of sections arranged in stacked or nested relation and overlaid on each side by a facing layer. A particularly convenient construction so formed is shown in FIG. 7, which illustrates a modified form of panel 25 which comprises a core assembly composed of two nested or stacked core sections 26, 27. In these two core sections, the pocket configurations, at least at the adjacent marginal portions of the sections, are such that the two sections can be overlapped so as to interengage with one another, as illustrated, in manner such that facing layers 28, 29 may be secured thereto wherefor the components of the core assembly are securely located relative to one another and there is no weakness at any junction therebetween.

Figure 4:
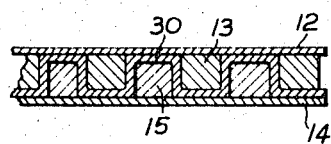
FIG. 4 is a view, comparable to FIG. 3 but on a smaller scale, illustrating part of a sandwich panel constructed in its entirety using the mold of FIGS. 1 and 2.

The foregoing discussion has been directed to the feature of the reusability of the molds of FIGS. 1 and 2. Mention has earlier been made of the fact that the mold may be so constructed that it can be used only once, in that it becomes integral with the molded article, and the FIG. 4 showing illustrates this feature.

In this instance, platens 12, 14 of the mold of FIGS. 1 and 2 are of a flexible material, such as a plastic material or veneered pliable boarding, suitable for employment as facing layers of sandwich panels, and the three-dimensional pattern elements 13, 15 are of a suitable comparatively rigid but lightweight material, for example a rigid polyurethane foam.

The mold, so constructed, is employed for molding a filling of a moldable material to constitute a pocketed core 30 of a configuration generally corresponding to that illustrated in FIG. 5, but with the molding operation being effected in such a way as to cause platens 12, 14 to become attached to the core, so that a sandwich panel is formed in a single molding operation whereby the core is formed and the facing layers are provided by platens 12, 14 themselves. This may be achieved, for example, by providing a coating of a suitable adhesive or bonding agent over those faces of platens 12, 14 which face the material being molded, and allowing or causing such adhesive or bonding agent to set. Other ways are, of course, possible. For instance, the moldable material forming core 30 and the material of platens 12, 14 may be such that they can be caused to become welded or fused together as a result, for instance, of heat applied during the molding operation such as high frequency heating or by making use of a heated press to force the platens together to mold the core to the desired shape. It is possible to effect the molding in accordance with the so-called "wet-in-wet" process, so that the facing layers will naturally adhere to the core.

Use of this latter process can be made in relation to the production of the panel of FIG. 3, previously described, in that after the step of molding core 16, forms 10, 11 can be separated to leave the core, still wet or not set, in position on one of such forms. Thereupon, one of the facing layers 22 or 23 can be applied, also in a wet or not completely set condition, to the exposed faces of the core so as to become adhered thereto. The other form can then be removed and a second facing layer can then be similarly applied. In so carrying out the invention, the pattern elements, if made of lightweight material, can be left in position in the pockets of the molded core, with only the platens being removed.

Referring once again to FIG. 4, it will be appreciated that in the molding of the illustrated panel, pattern elements 13, 15 become molded into the finished panel. For this reason, it is desirable to employ pattern elements of a lightweight material, such as a foamed plastic material as above discussed, to minimize the weight of the finished panel.

The invention does not, however, exclude the possibility of elements 13, 15, in the panel of FIG. 4, being of a heavy solid material. However, in the latter instance the resultant panel will be heavier and somewhat more expensive than in the case where, for instance, foamed plastic is employed.

Figure 8:
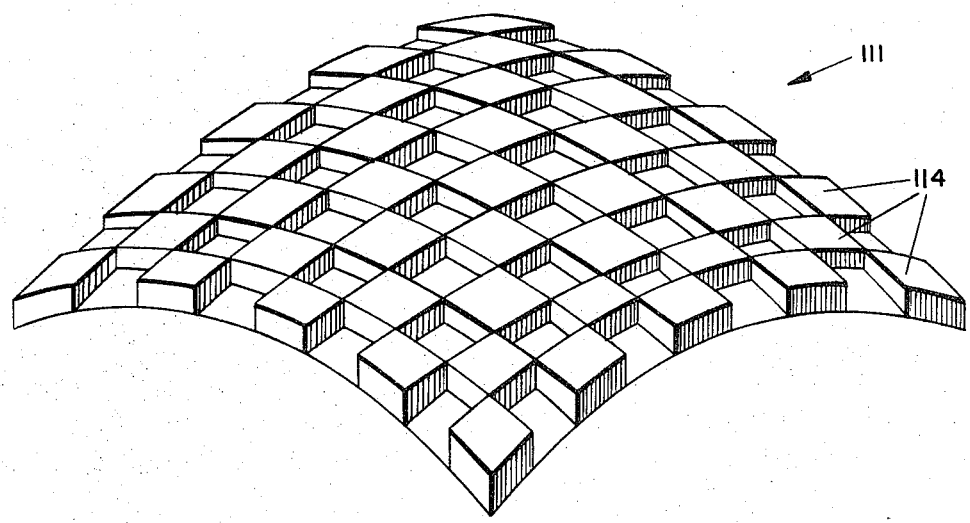
FIG. 8 is a view, in perspective, of a three-dimensional shaped mold with three-dimensional shaped cores.

In the FIG. 8 showing, I have shown a three-dimensional shaped mold for forming a resultant core of three-dimensional shape.

In such instance, only a lower form 111 is shown. It will be understood to coact with an upper platen (not shown), each of which is complemental to the other, and each of which is shaped into an appropriate three-dimensional configuration.

The lower form is seen to comprise a platen made of a flexible material, such as a fully-cured or polymerized, or partially-cured or partially-polymerized plastic material, from the upper surface of which project a plurality of three-dimensional pattern elements 114, which may again be of a fully or partially cured plastic material, but may be of metal, wood, or a foamed palstics, material. These pattern elements may be permanently secured in position or may be detachably secured in any convenient manner.

The upper form is substantially identical, as previously mentioned so that the two forms complement each other with the pattern elements of one fitting into the provided spaces of the other in interdigitating manner.

Here again of course, the mold can be constructed so as to be reusable for molding a succession of articles, or so as to be usable only once in the respect that it may become integral with the article being molded thereby and therefore no longer available for reuse.

The key feature in all forms of the invention is in the provision of a mold for forming of a planar moldable material into any geometric or nongeometric, symmetrical or asymmetrical configuration in between two flexible (external) platens with three-dimensional pattern elements. The complete mold, in moldable condition with both upper and lower flexible molding forms (platens), is adaptable to any three-dimensional configuration. For shaping the complete mold into a three-dimensional configuration and only for this reason, the molding forms (platens) have to be flexible.

I claim:

1. A method of forming a planar moldable material into a three-dimensional configuration in the form of an inner three-dimensional core of hollow formation sandwiched between a pair of outermost facing layers comprising the steps of: molding a core by introducing a moldable plastic material into the spaces between a confronting pair of mold forms with each of the mold forms having an arrangement of three-dimensional pattern elements projecting from a flexible platen of the mold form and with the pattern elements of one mold form being interdigitated with the pattern elements of the other mold form, allowing the moldable plastic material to set, removing the formed core from between the mold forms, and bonding a facing layer to each of the opposite faces of the formed core.

2. A method according to claim 1, wherein a plurality of cores, removed from the mold, are nested one within the other with their adjacent marginal portions interengaged, and the facing layers are applied to opposed faces of the core assembly so obtained.

3. A method according to claim 1, wherein one of the facing layers is applied to the core while the latter is in position on one of the mold forms, and prior to complete setting of the moldable plastic material, so that the said one of the facing layers adheres directly thereto, and the core is removed from the mold and the other of the facing layers is applied thereto.

References Cited

UNITED STATES PATENTS

| | | | |
|---|---|---|---|
| 3,017,205 | 1/1962 | Barut | 156—197X |
| 3,033,734 | 5/1962 | Price | 156—197UX |
| 3,070,480 | 12/1962 | Breiner | 156—197UX |
| 3,082,142 | 3/1963 | Payne et al. | 156—197 |
| 3,288,663 | 11/1966 | Webb et al. | 156—242X |

BENJAMIN R. PADGETT, Primary Examiner

S. J. LECHERT, Jr. Assistant Examiner

U.S. Cl. X.R.

156—219, 245, 289, 290, 292, 293, 303.1, 306, 309; 161—68, 69; 264—313